Aug. 17, 1965   R. C. BOWERS   3,201,662
SOLENOID CLUTCH CONTROL HAVING AN S-SHAPED SUPPORT MEMBER
Original Filed March 11, 1959
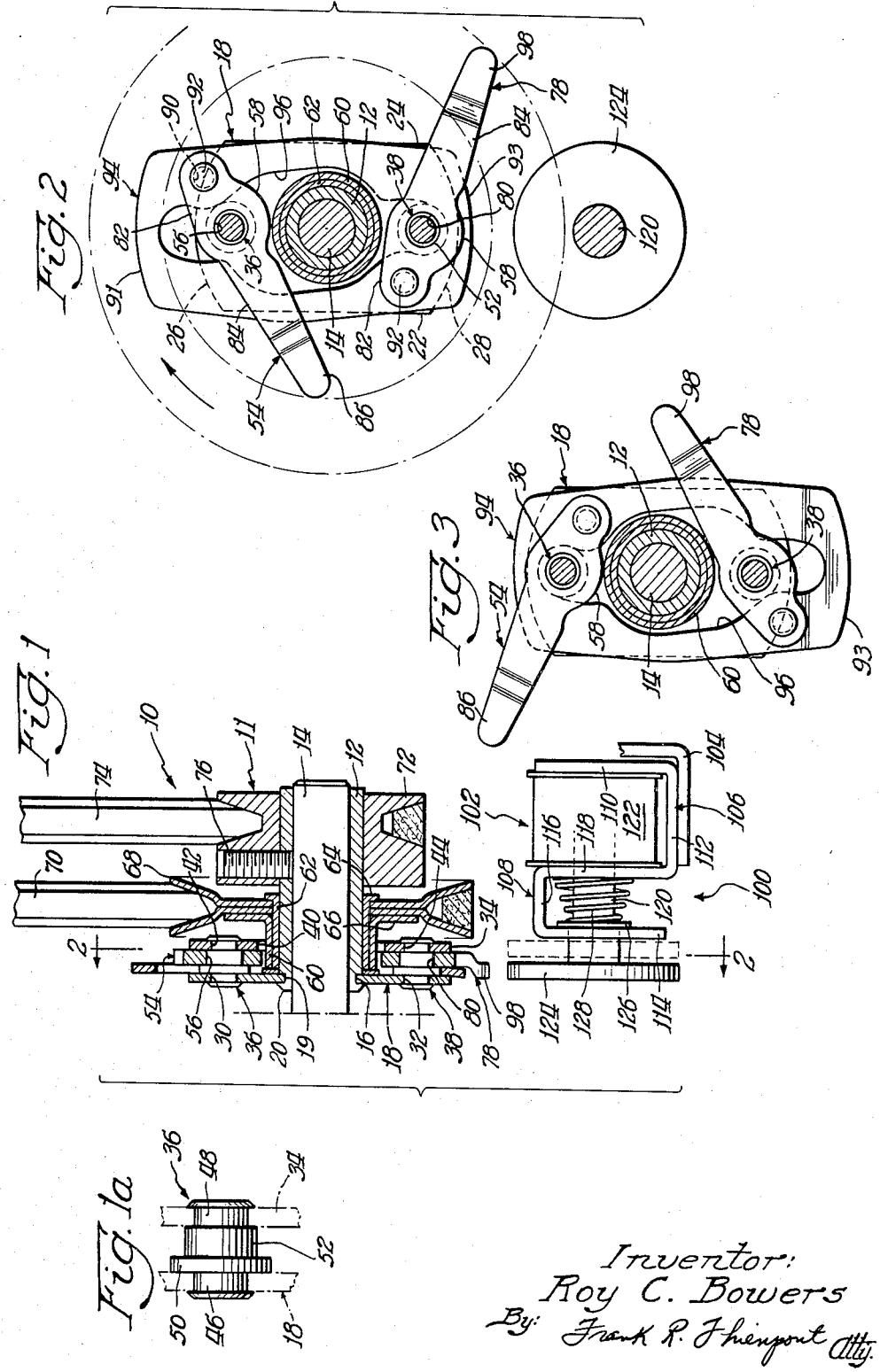
Inventor:
Roy C. Bowers
By: Frank R. Thienpont Atty.

United States Patent Office 3,201,662
Patented Aug. 17, 1965

3,201,662
SOLENOID CLUTCH CONTROL HAVING AN S-SHAPED SUPPORT MEMBER
Roy C. Bowers, Bellwood, Ill., assignor to Borg-Warner Corporation, Chicago, Ill., a corporation of Illinois
Original application Mar. 11, 1959, Ser. No. 798,660, now Patent No. 3,080,027, dated Mar. 5, 1963. Divided and this application June 28, 1961, Ser. No. 120,414
1 Claim. (Cl. 317—191)

This application is a division of my copending application Serial No. 798,660 for a Clutch, filed March 11, 1959, now Patent No. 3,080,027.

This invention relates to clutches and in particular to a solenoid control device for actuating a clutch of the type described.

An object of the present invention is to provide a control assembly which is effective to selectively position a solenoid plunger.

Another object is to provide a solenoid control assembly combination wherein solenoid bracket supporting means and means mounted on the solenoid are effective to position the solenoid plunger at predetermined positions.

This invention consists of the novel constructions, arrangements, and devices to be hereinafter described and claimed for carrying out the above stated objects and such other objects as will be apparent from the following description of preferred forms of the invention, illustrated with reference to the accompanying drawings, wherein:

FIGURE 1 is an elevational sectional view illustrating a clutch system embodying the principles of the present invention;

FIGURE 1a is an enlarged elevational view of a trunnion forming a part of the clutch system of FIGURE 1;

FIGURE 2 is an elevational view, partly in section, taken substantially on line 2—2 of FIGURE 1 and showing the clutch in disengaged position;

FIGURE 3 is a view similar to FIGURE 2 but showing the clutch in engaged position.

Referring now to the drawings and more particularly to FIGURE 1 a clutch system is indicated generally by reference numeral 10 and includes an input element or driving member 11 which includes an input sleeve 12, preferably of hard metal such as steel or the like, illustrated as being rotatably mounted on a stub shaft 14. This clutch system is illustrated as one example of a device with which a control assembly 100 may be used. At one end of the sleeve 12 is an annular groove 16 in which is received a drive plate 18, also preferably of steel or the like having a central opening 19. Preferably the groove 16 is formed by swaging the outer edge of the sleeve against the plate 18 as at 20. The plate 18, as shown best in FIGURES 2 and 3, is of generally rectangular configuration and has parallel side edges 22 and 24 and arcuate end edges 26 and 28 preferably formed about an axis coincident with the axis of the sleeve 12. Openings 30 and 32 are formed in the plate 18 at points oppositely disposed with respect to the axis of the sleeve 12 and adjacent the arcuate edges 26 and 28 respectively. A plate 34, similar to the plate 18 is maintained in axially spaced relation with respect to the plate 18 by means of trunnions 36 and 38. It will be noted that the plate 34 has a central opening 40 of greater diameter than the central opening 19 of the plate 18. Openings 42 and 44 are formed in the plate 34 and in the assembled position of the parts illustrated are in register with the openings 30 and 32 respectively of the plate 18.

As shown clearly in FIGURE 1a the trunnion 36 is of the step type and includes end portions 46 and 48, of equal diameter, received in the openings 30 and 42 respectively and swaged to the plate 18 and the plate 34 respectively. Between the end portions 46 and 48 is a portion 50 of relatively large diameter and a portion 52 of a diameter larger than that of the portions 46 and 48 but less than the diameter of the portion 50. The purpose of the portion 50 will hereafter be described.

Referring now to FIGURES 2 and 3 a sprag arm or tiltable gripper 54 is provided adjacent one end thereof with an opening 56 in which is received the portion 52 of the trunnion 36. The sprag arm 54 may be rotated about the trunnion 36 in a manner hereinafter described and is provided on one side thereof with a cam surface 58. Upon rotation of the sprag arm 54 in a clockwise direction, as viewed in FIGURES 2 and 3, the cam surface 58 is brought into snubbing engagement with an output sleeve 60 which is mounted in surrounding relation to the sleeve 12. A bushing 62 having radially outwardly extending thrust flange 64 is interposed between the sleeve 12 and the sleeve 60. A radially outwardly extending flange 66 is formed with the sleeve 60 and is secured by any suitable means to an output pulley 68 which may receive an ouput belt 70.

The sleeve 12 is illustrated as being driven by means of an input pulley 72 and an input belt 74 from a suitable source of rotative power. A setscrew 76 is utilized to connect the pulley 72 and the sleeve 12 in driving relation. It will be appreciated that the sleeve 12 may be driven by other means than the pulley 72. For instance, the shaft 14 may be of the driving type. The trunnion 38 is identical to the trunnion 36 and will not be further described in detail. The same reference numerals as that of trunnion 36 are utilized to designate the several constituent parts of the trunnion 38.

Referring again to FIGURES 2 and 3, a lever arm 78, identical to the sprag arm 54, is provided with an opening 80 adjacent one end thereof for reception of the portion 52 of the trunnion 38. It will be noted that the sprag arm 54 is divided by the opening 56 into a foot section 82 and an elongated outwardly extending leg portion 84 of tapered configuration and having at the outer end an axially offset tab 86. An opening 90 is formed in the foot portion 82 for reception of a pin 92 which passes through a registering opening at one side of a control link 94. The control link 94 has an irregularly formed central opening 96 through which passes the sleeve 12 and the trunnions 36 and 38. The shape of the boundary edges is similar to that of the plate 18 but the longitudinal length is slightly greater. The outer boundary is defined in part by an arcuate edge 91 adjacent the sprag arm 54 and an arcuate edge 93 adjacent the lever arm 78.

The lever arm 78, as mentioned previously, is identical to the sprag arm 54 with the exception that a tab 98 is formed at the outer end of the section 84 and extends axially oppositely into a different plane from that of the tab 86. In all other respects the same reference numerals have been utilized to designate identical parts of the lever arm 78. It will be noted that the sprag arm 54 is turned side for side to form the lever arm 78. As a result, the cam surface 58, of the lever arm 78 is located on the opposite side of the axis of the trunnion and is never brought into contact with the sleeve 60. As in the case of the sprag arm 54 a pin 92 connects the foot portion 82 of the lever arm 78 to the control link 94 at a point oppositely disposed from the axis of the sleeve 12. Stated another way, the several pins 92 are located on opposite sides of intersecting planes passing through the axis of rotation.

It will be noted that in the disengaged position of the clutch illustrated in FIG. 2 the tab 98 of the lever 78 describes a circle of greater diameter than that of the tab 86 of the sprag arm 54, while in the engaged position of the clutch illustrated in FIGURE 3, the tab 86 describes a circle of greater diameter than that of the tab 98 of the lever arm 78. It will be noted also that in the engaged position of the clutch illustrated in FIGURE 3 the cam surface 58 of the sprag arm 54 is shown in wrap-up position with the output sleeve 60.

To disengage the clutch of the present invention, the sprag arm 54 is rotated in a manner hereafter apparent in a counterclockwise direction so that it assumes the position shown in FIGURE 2.

To engage the present clutch the lever arm 78 is rotated in a counterclockwise direction in a manner hereafter described about the axis of the trunnion 38 and because of the connection of the lever arm 78 with the link 94, the link 94 is drawn downwardly thus rotating the sprag arm 54 about the axis of the trunnion 36 so that it assumes the engaged position illustrated in FIGURE 3. It will be appreciated that the link 94 is moved in the opposite direction when the sprag arm 54 is rotated to disengage the clutch in the manner above set forth.

As mentioned previously, the respective tabs 86 and 98 are offset axially in different planes. Whichever tab is outermost, i.e., describes a circle of greater diameter, may be engaged and moved inwardly for engagement or disengagement of the clutch, as the case may be, by a control assembly 100 which will now be described in detail.

The control assembly 100 includes a solenoid 102 carried by a bracket 104 which may be secured to any suitable stationary support. The solenoid 102 is of the S-frame type and includes a first portion 106 secured to the bracket 104 and a second portion 108. The first portion 106 has an arm 110 and a base portion 112 while the second section 108 has an arm 114 and a base portion 116. An arm 118, integral with the base portion 112 and the base portion 116 joins the two portions. The arms 118 and 114 are apertured for sliding reception of a plunger 120 which may be moved to the right, as viewed in FIGURE 1, upon energization of a coil 122. At the outer end of the plunger 120 is affixed a disc 124. Upon energization of the coil 122 the disc 124 is moved from the position shown in solid lines to the position shown in dot-and-dash lines. The plunger 120 is formed with a radial flange 126 and a frusto-conical spring 128 extends between the flange 126 and the arm 118 to return the disc 124 to the position shown in solid lines. It will be noted that the disc 124 in the solid line position is coplanar with the tab 98 of the lever 78 while in the dot-and-dash lines it coincides with the axial plane of the tab 86. When the tab 98 is engaged by the disc 124 the lever arm 78 is rotated counterclockwise, as viewed in FIGURE 2, so that the disc 124 is no longer in the path of travel of the tab 98. It will be appreciated that in the engaged position of the clutch the coil 122 is de-energized and the disc 124 remains coplanar with the tab 98. The sprag arm 54 is rotated in a clockwise direction in the manner above set forth until it reaches the engaged position illustrated in FIGURE 3.

When disengagement is desired, the coil 122 is energized and the disc 124 is moved to the dot-and-dash line position in a plane coincident with the tab 86 of the sprag arm 54. At this time the tab 86 describes a circle of greater diameter and disc 124 engages the tab 86 of the sprag arm 54 for rotation of the sprag arm 54 in a counterclockwise direction to disengage the cam surface 58 from the outer periphery of the sleeve 60. The lever arm 78 is returned by means of the link 94 to the position shown in FIGURE 2.

Assuming clockwise rotation of the sleeve 12, as shown by the arrow in FIGURE 2, engagement of the tab 98 by the disc 124 initiates rotation of the sprag arm 54 and complete engagement of the cam surface 58 with the periphery of the sleeve 60 is effected by the resultant of the centrifugal forces acting upon the combination of sprag arm 54, control link 94 and lever arm 78. To prevent bouncing when the arms are returned to the position shown in FIGURE 2, the arcuate edge 93 of link 94 is bent axially as shown best in FIGURE 1, to provide frictional resistance.

While I have described my invention in connection with certain specific constructions and arrangements, it is to be understood that this is by way of illustration and not by way of limitation and the scope of my invention is defined solely by the appended claim which should be construed as broadly as the prior art will permit.

I claim:

Control means comprising:
a substantially S-shaped bracket being formed of first, second and third portions,
a solenoid coil mounted between said first and third portions,
a plunger projecting through said second and third portions,
plunger retaining means mounted on said plunger and adapted to be positioned substantially against said second portion,
biasing means between said retaining means and said third portion for urging said plunger to a first position when said solenoid is not energized, and
means on said second portion for positioning said plunger in a second position when said solenoid is energized.

References Cited by the Examiner

UNITED STATES PATENTS 2,516,362   7/50   Bauer _____ 317—191
2,722,299   11/55  Otis et al. _____ 192—26
3,134,934   5/64   Brandell _____ 317—191

LARAMIE E. ASKIN, *Primary Examiner.*

JOHN F. BURNS, *Examiner.*